United States Patent
Thibadeau, Sr.

(10) Patent No.: US 11,720,677 B2
(45) Date of Patent: Aug. 8, 2023

(54) ATTACHED STORAGE DEVICE FOR ENHANCED DATA AND PROGRAM PROTECTION

(71) Applicant: Antique Books, Inc., Pittsburgh, PA (US)

(72) Inventor: Robert H. Thibadeau, Sr., Pittsburgh, PA (US)

(73) Assignee: Antique Books, Inc., Pittsburgh, PA (US)

( * ) Notice: Subject to any disclaimer, the term of this patent is extended or adjusted under 35 U.S.C. 154(b) by 0 days.

(21) Appl. No.: 16/612,479

(22) PCT Filed: May 11, 2018

(86) PCT No.: PCT/US2018/032292
§ 371 (c)(1),
(2) Date: Nov. 11, 2019

(87) PCT Pub. No.: WO2018/209217
PCT Pub. Date: Nov. 15, 2018

(65) Prior Publication Data
US 2020/0065491 A1    Feb. 27, 2020

Related U.S. Application Data

(60) Provisional application No. 62/504,803, filed on May 11, 2017.

(51) Int. Cl.
G06F 21/56    (2013.01)
G06F 21/62    (2013.01)
G06F 21/78    (2013.01)

(52) U.S. Cl.
CPC ........ *G06F 21/566* (2013.01); *G06F 21/6218* (2013.01); *G06F 21/78* (2013.01)

(58) Field of Classification Search
CPC .... G06F 21/566; G06F 21/6218; G06F 21/78; G06F 21/562; G06F 21/56; G06F 21/62
See application file for complete search history.

(56) References Cited

U.S. PATENT DOCUMENTS 6,532,535 B1 *  3/2003  Maffezzoni ......... G06F 11/1458
                                                    713/1
7,036,020 B2    4/2006  Thibadeau
(Continued)

OTHER PUBLICATIONS

International Search Report and Written Opinion for International Patent Application No. PCT/US2018/032292, dated Sep. 6, 2018, 11 pages.
(Continued)

*Primary Examiner* — Jayesh M Jhaveri
(74) *Attorney, Agent, or Firm* — Withrow + Terranova, PLLC (57) ABSTRACT

Systems and methods for advanced data and program protection are provided. Some embodiments extend the data-at-rest protection naturally provided by some self-encrypting drives in order to provide additional assurances to data-in-motion and data-in-use in the host computer to which the attached storage device is attached. In some embodiments, this protection is available even if only intermittently attached, and it requires no software to be installed on the host machines because the software run on the host is run in the host off the attached storage drive itself.

8 Claims, 6 Drawing Sheets

(56) References Cited

U.S. PATENT DOCUMENTS

| | | | |
|---|---|---|---|
| 7,360,057 B2 | 4/2008 | Hars et al. | |
| 7,426,747 B2 | 9/2008 | Thibadeau | |
| 7,762,470 B2* | 7/2010 | Finn | H04H 60/74 |
| | | | 235/492 |
| 8,621,178 B1* | 12/2013 | Lazar | G06F 3/0605 |
| | | | 711/173 |
| 2003/0188117 A1* | 10/2003 | Yoshino | G06F 21/78 |
| | | | 711/164 |
| 2006/0069840 A1* | 3/2006 | Corbett | G06F 21/79 |
| | | | 710/313 |
| 2007/0192852 A1* | 8/2007 | Watanabe | G11B 19/122 |
| | | | 726/21 |
| 2008/0109662 A1* | 5/2008 | Natarajan | G06F 12/1408 |
| | | | 713/193 |
| 2008/0189554 A1* | 8/2008 | Ali | H04L 9/0891 |
| | | | 713/189 |
| 2008/0282350 A1 | 11/2008 | Khilnani et al. | |
| 2009/0076849 A1* | 3/2009 | Diller | G06F 21/6245 |
| | | | 705/3 |
| 2009/0121028 A1* | 5/2009 | Asnaashari | G06F 12/0238 |
| | | | 235/492 |
| 2010/0172050 A1* | 7/2010 | Perusse, Jr. | G11B 15/689 |
| | | | 360/71 |
| 2012/0117348 A1* | 5/2012 | Triantafillou | G06F 21/566 |
| | | | 711/163 |
| 2013/0067242 A1* | 3/2013 | Lyakhovitskiy | G06F 21/78 |
| | | | 713/193 |
| 2018/0239912 A1* | 8/2018 | Welch | G06F 21/604 |
| 2018/0268146 A1* | 9/2018 | Suryanarayana | G06F 21/445 |

OTHER PUBLICATIONS

International Preliminary Report on Patentability for International Patent Application No. PCT/US2018/032292, dated Nov. 21, 2019, 6 pages.

* cited by examiner

ATTACHED STORAGE DEVICE FOR ENHANCED DATA AND PROGRAM PROTECTION

RELATED APPLICATIONS

This application is a 35 U.S.C. § 371 national phase filing of International Application No. PCT/US18/32292, filed May 11, 2018, which claims the benefit of provisional patent application Ser. No. 62/504,803, filed May 11, 2017, the disclosures of which are hereby incorporated herein by reference in their entireties.

FIELD OF THE DISCLOSURE

This disclosure relates generally to encrypted storage devices.

BACKGROUND

USB and other, attached storage devices often come with encryption hardware and host interface software to protect data-at-rest. These devices are generically described as containing self-encrypting or hardware-encrypting disk or solid-state drives. However, there is a need for extending this protection to data-in-motion and data-in-use.

SUMMARY

Systems and methods for advanced data and program protection are provided. Some embodiments extend the data-at-rest protection naturally provided by some self-encrypting drives in order to provide additional assurances to data-in-motion and data-in-use in the host computer to which the attached storage device is attached. In some embodiments, this protection is available even if only intermittently attached, and it requires no software to be installed on the host machines because the software run on the host is run in the host off the attached storage drive itself.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Some embodiments extend the data-at-rest protection naturally provided by some self-encrypting drives in order to provide additional assurances to data-in-motion and data-in-use in the host computer to which the attached storage device is attached. In some embodiments, this protection is available even if only intermittently attached, and it requires no software to be installed on the host machines because the software run on the host is run in the host off the attached storage drive itself.

Self-encrypting drive technology for data-at-rest protection is taught by the Trusted Computing Group (TCG, www.trustedcomputinggroup.org) and The Drive Trust Alliance (www.drivetrust.com/education/education). Specifically it is taught in the public, industry standard, Core, Opal, and Enterprise Drive specifications and associated literature (www.trustedcomputinggroup.org, see Storage Workgroup) and defined in www.drivetrust.com. The TCG Core, Opal, and Enterprise published specifications, in all versions, are hereby incorporated by reference herein. Relevant self-encrypting drive technology is further taught in U.S. Pat. Nos. 7,036,020, 7,360,057, and 7,426,747.

To apply to data-in-motion, data-in-use, as well as data-at-rest protection, the present approach adopts a novel and unique reference monitor approach to modifying existing self-encrypting drive technology. The role of the reference monitor is to watch the activities in the host computer(s) and evaluate these activities against a known good reference which is securely protected.

Additionally, some embodiments provide automated remediation that can be tuned to the nature of the security issues encountered in the host computer. Embodiments disclosed herein may work with legacy computers, computers running legacy operating systems, as well as new ones, as long as these support an industry standard drive interface, such as USB, M.2, SATA or SAS, to the attached storage device. In fact, some embodiments naturally extend to all types of computer systems including end-points such as laptops, desktops, and smart phones, data-center server-farm computers, and industrial or commercial IoT computers. It requires no material enhancement to the host computers to which these self-encrypting drives are attached except to support the industry standard commands through the interface that communicates with the self-encrypting drive.

Some embodiments are specifically designed for use in protecting against ransomware attacks, but other forms of phishing, malware injection, or even insider attacks to inject other forms of malware are also anticipated. Also anticipated are inadvertent software failures that have disabled the proper functioning of the main processor unit including its default boot storage and other attached storage devices.

With commercially available self-encrypting drives such as TCG Opal (or TCG Enterprise), the protection is provided by industry standard hardware inside the drives that are inside the attached storage device. Other attached storage devices are commercially available that have proprietary self-encrypting capabilities that are similar to the TCG storage standards. These proprietary implementations of self-encryption may also apply in some embodiments of the current disclosure.

The self-encrypting drive features essential to some embodiments are met by the TCG Opal and TCG Enterprise specifications. This is not always the case even for industry standard self-encrypting drives. Another industry standard for self-encrypting drives is through a SATA interface invoking the ISO/INCITS SATA Security Commands, but these commands do not support some embodiments of the current disclosure.

While both the TCG and SATA Security Commands support self-encrypting drives for the data-at-rest protection use case already in commercial use in industry, the current disclosure advances this to the use cases of data-in-motion and data-in-use through universal-host malware detection and malware remediation.

The properties of the TCG Opal and TCG Enterprise drives that enable some implementations of the current disclosure include:
1. The drive's built-in cryptography requires a secret external to the drive to modify the security isolation settings inside the drive. A drive that is powered off is locked by the cryptographic security isolation mechanisms. Other security settings include ranges of logical blocks that may be independently locked or unlocked even if one or more other ranges is already unlocked or locked.
2. More than one external authentication secret, called an "authority" in the TCG specifications, can be recognized by the drive. Specifically there should be at least one Administrator Authority that the drive can authenticate and thereby be authorized to (a) create and configure the drive with ranges and cryptographic locking, and (b) create and manage a minimum number of four User authorities with limited capability to lock and unlock the individual ranges for Read/Write, Read Only, or Write Only operations. Individual ranges may have different User Authorities. Optionally they may also have different Administrator Authorities.
3. At least one range can be read without Administrator or User Authentication. In configuring this range for write operations needed to install the software, at least one Administrator Authority is required. Other ranges may be variously locked and then later unlocked for Read-Only, Read/Write, and optionally Write-Only.

It should be noted that because ranges can be configured with software that is Read-Only, some embodiments effectively make firmware changes to the drives and alters the basic form of the hardware storage device in order to operate as a reference monitor on host behavior and storage for normal operations. Certain improvements, described below, may also be made by the drive manufacturer to have the software/firmware installed on the drives before manufacture is complete in order to further enhance the security profile associated with these embodiments. For exposition, and for these reasons, the resulting Opal or Enterprise drive will be called a Diamond drive.

For the sake of this exposition, the Diamond drive may be configured with executable software as well as data. These will be termed Tools. A Tool in this case may be a hierarchical collection of executables and data. What is known commonly as an operating system may be considered a Tool. Similarly, a BIOS is another Tool.

Figure 1:
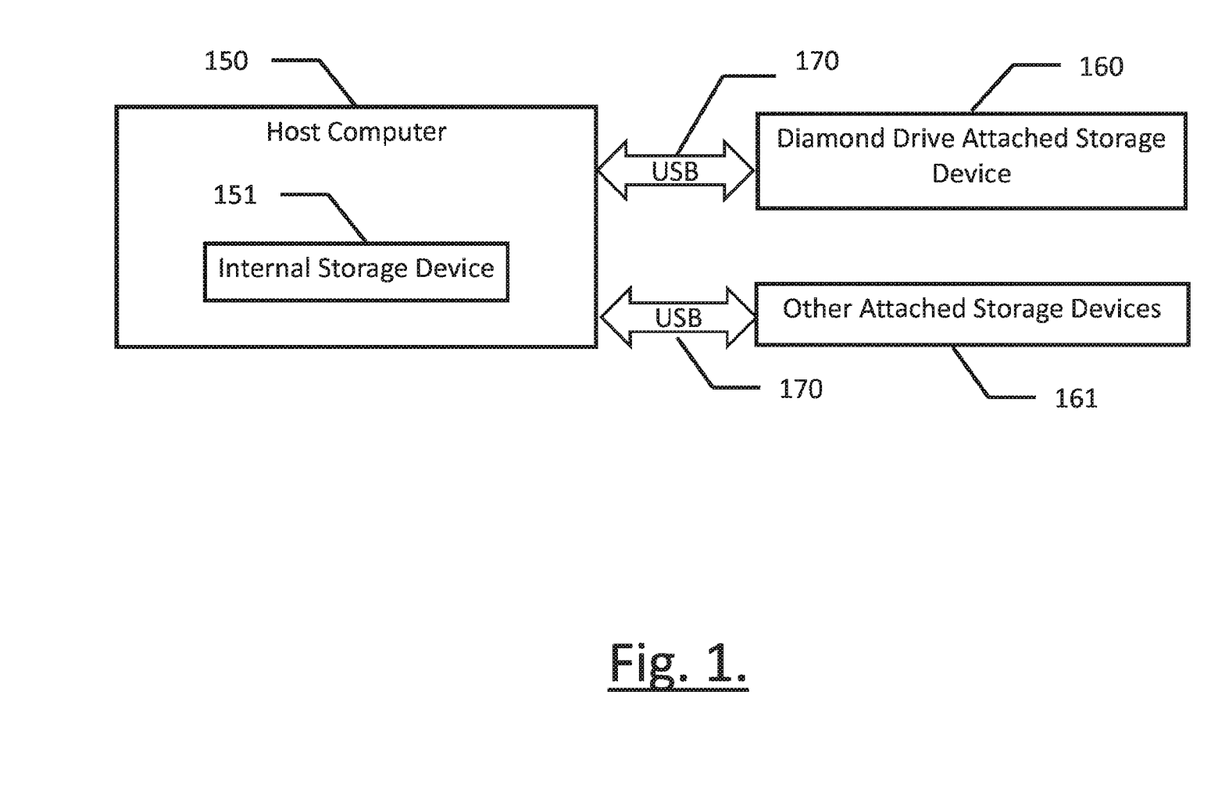
FIG. 1 illustrates a host computer in operation with an attached drive according to some embodiments of the current disclosure.

FIG. 1 shows that in routine use, the host computer in operation 150 with its own internal storage in operation 151 is attached to a Diamond drive in operation 160 via a USB storage interface in operation 170 (or other well-defined storage device attachment interface including but not limited to PCIe, M.2, SATA, SAS). Other attached storage devices, including network attached devices, in operation 161 may be attached to the host computer by way of the same or similar storage interfaces.

Figure 2:
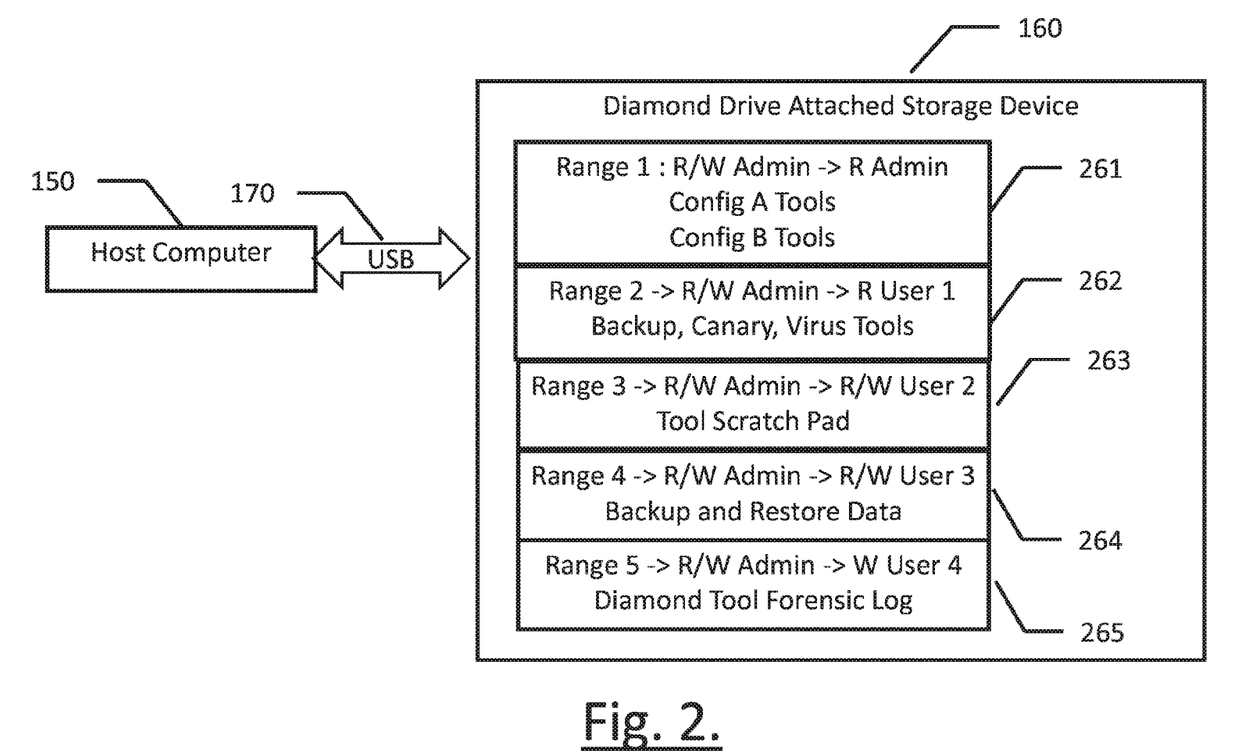
FIG. 2 illustrates an attached drive with five separate ranges according to some embodiments of the current disclosure.

FIG. 2 shows that in routine use, the Diamond Drive will have a minimum of five ranges when fully configured. Range 1 is accessible only by the Administrator, which is initially a Read-Write Authority, then set to Read-Only in operation 261. Ranges 2-5 are all Read/Write by the Administrator, but Range 2, containing the data-at-rest, data-in-use and data-in-motion tools is Read Only by User 1 in operation 262. The base set of tools includes Backup, Canary, and Virus Checker tools. Range 3 is a scratch pad for the Diamond toolset and is Read/Write by User 2 in operation 263. Range 4 is the location where the Backup Tool backs up Host data in operation 264 and is R/W by User 3. Range 5 is a Forensic Log kept only by Diamond Tools and is Write-Only by User 4.

Figure 3:
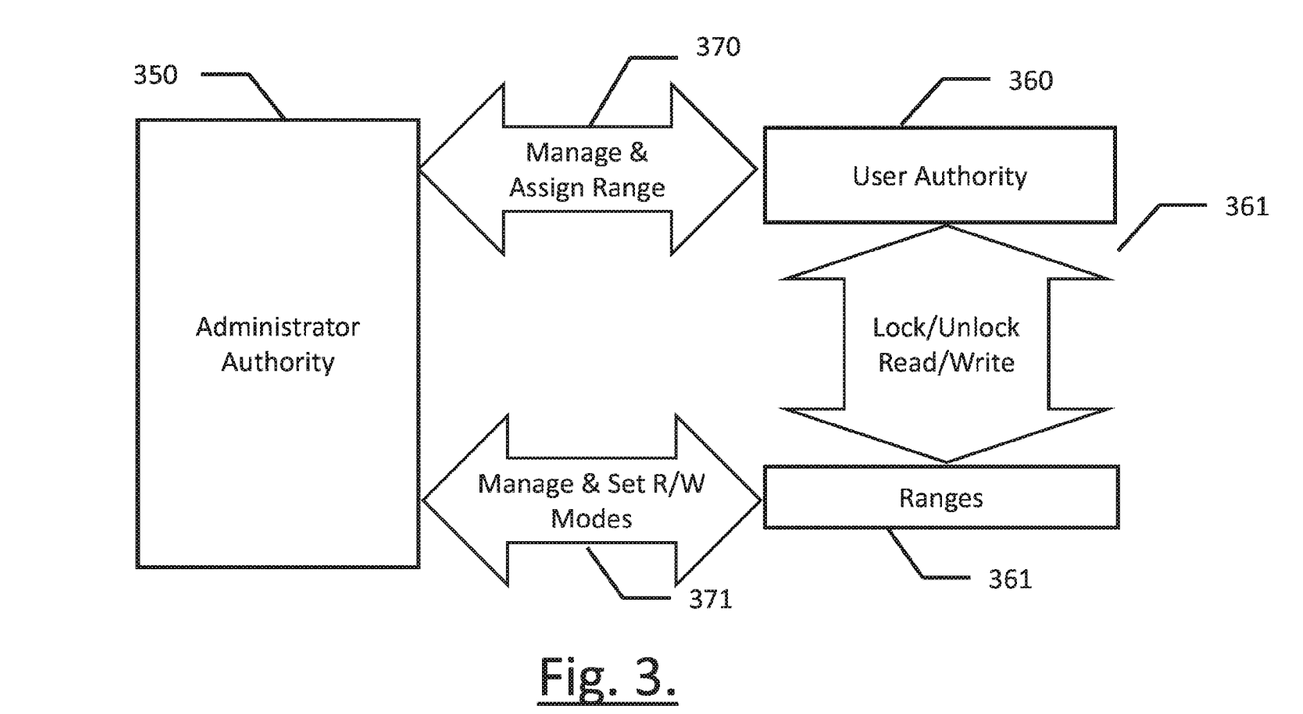
FIG. 3 illustrates an operational flow of an administrator authority according to some embodiments of the current disclosure.

FIG. 3 shows that the administrator authority in operation 350 can establish the four user authorities in operation 360 by managing and assigning ranges to them in operation 370. The administrator authority can establish all the Ranges in operation 361 and manage and set the Read-Write modes on each. Each user authority in operation 360 can lock or unlock its assigned range, and can read or write according to the rules in FIG. 2. Also, the administrator authority can manage and set Read/Write modes 371.

Figure 4:
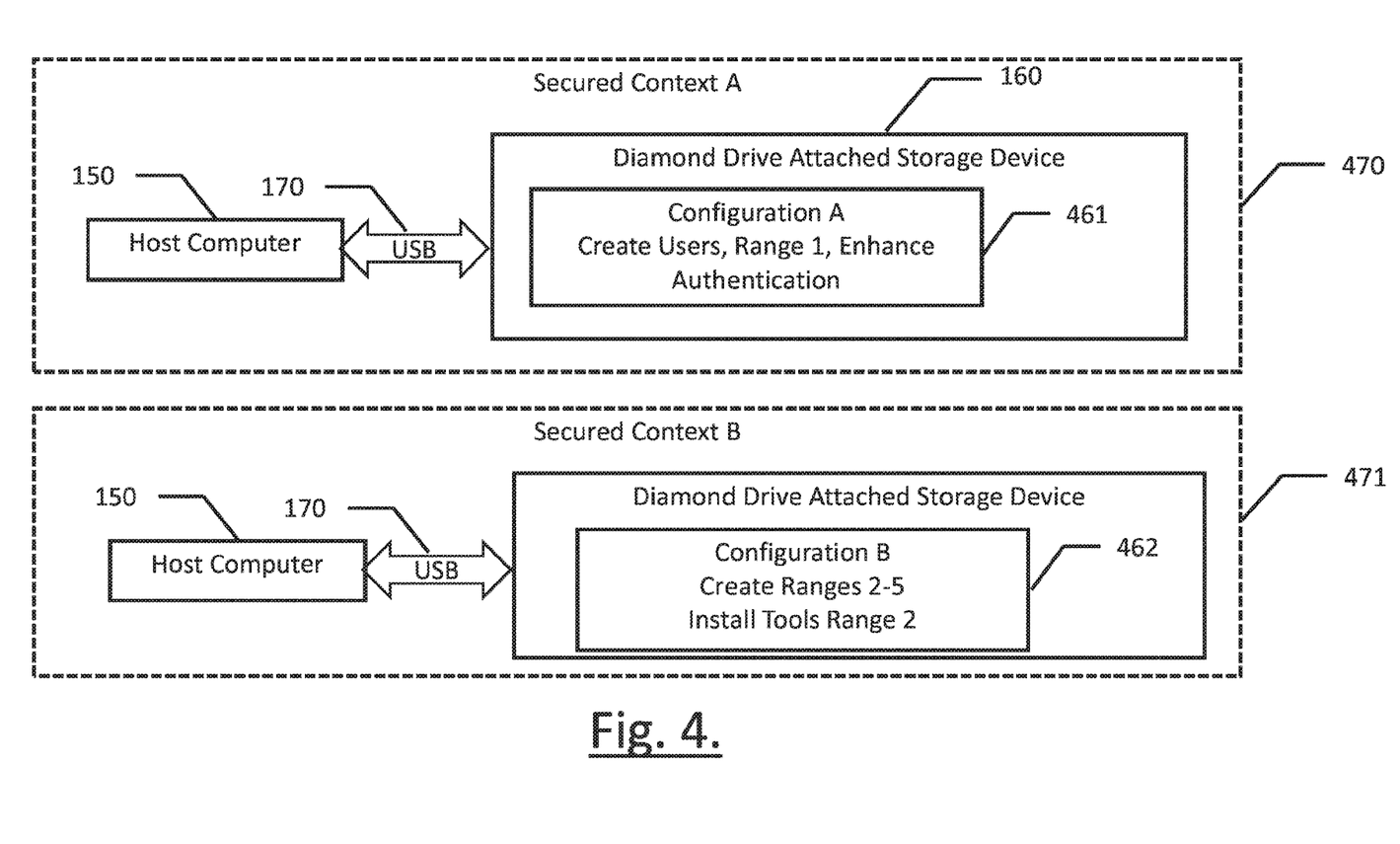
FIG. 4 illustrates how a drive may be configured in a secure setting according to some embodiments of the current disclosure.

FIG. 4 shows the Diamond drive is configured, in a secure setting 470 attached to a known secure host, in the following steps:
Configuration Step A in operation 461
1. Configure the Diamond drive with at least one Administrator over a minimum of five ranges with Ranges 2-5 with at least one range-unique User authority.
2. Range 1 is the only range that is initially unlocked for reading and writing and configured with at least one Administrator.
3. Range 1 is written with a file system and one or more Tools that can execute in the host processor operating system environment.
4. Range 1 is written with an operating system and BIOS Tool so the attached storage device can be employed as a boot device under Range 1 Tool enable/disable control (see Range 2 below) in order to guarantee the Host is operating in a known operating system environment.
5. The Range 1 Tool may also require authentication which is not part of the inherent security settings inside of Opal. For example, it may perform public key cryptography in order to authenticate and authorize access to the secure setup, and optionally provide the capability to reveal derivative secrets needed authenticate users or optionally one or more additional Administrators that can perform special actions to separate Administrator responsibilities. Public key cryptography in the Range 1 Tool permits the hiding of user secrets until they are needed by other Tools. Note in Opal and Enterprise product shipping today the Authentication Secrets supported by the internal drive firmware are 32 byte random numbers that can act in symmetric encryption but not public key.

6. Range 1 is made Read-Only under exclusive Administrator authority to convert back to Read/Write.

The following configuration may be performed in the same secure environment A as above or in another secure environment with another secure host in operation 471, at a later time. If configuration A followed by B is so divided, then the Range 1 Tool will have the capacity to take the following steps and install the appropriate Tools into the newly defined other Ranges.

Configuration Step B in Operation 471

1. Range 2-5 (and optionally more) will be set up with sizes of these ranges which may depend on end use context. For example, a particular IT Department that purchases the Diamond drive may run the Range 1 Tool to set up the other Ranges. The size of these ranges may depend on the specific context in which the drive is deployed. Furthermore the selection of Tools installed in the other ranges that are appropriate to the context of use may be selected based on the context. The tools that run on the Host may come in different versions depending on the operating system in the Host and the resident secure operating system offered through a Range 1 boot.

This completes the configuration of a Diamond Drive for use in malware detection and remediation on a host. At this point, simply attaching the Diamond Drive through a common interface including but not limited to a USB, M.2, or SATA interface would be sufficient to set the Diamond Drive in action if "autoplay" is employed by a Tool in Range 1 or by a call to run that Tool in Range 1 once the drive is detected and mounted.

List of Basic Tools for Malware Detection and Remediation

The tools installed in other Ranges include tools that may execute out of one read-only range but write to a different read/write or write-only range. It is assumed that Range 2 is read-only for all the executable tools that may manage data between the host with its non-Diamond associated storage and other ranges (Ranges 3-5). For this embodiment, Range 3 is a scratchpad data configuration range employed by any Tool in the Toolset that has a right to the User 2 authority credential from the appropriate Range 1 Toolset application, and Range 4 is a host-data-and-program backup range.

Figure 5:
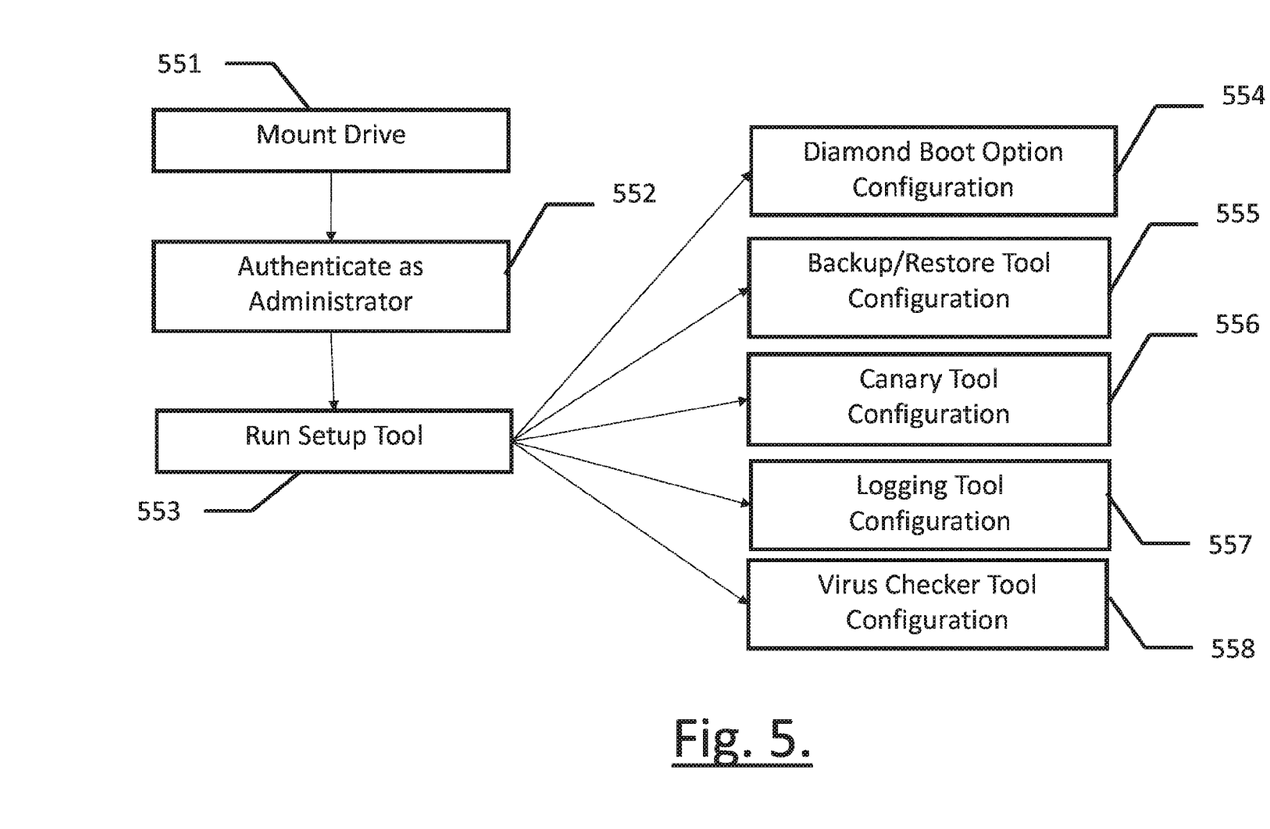
FIG. 5 illustrates an administrator configuration according to some embodiments of the current disclosure.

FIG. 5 shows the administrator configuration. It begins with mounting the drive in operation 551, authenticating as Administrator authority in operation 552, and running the setup tool 553. The setup tool allows the administrator to configure in operation 554 the Diamond Boot Option Configuration, in operation 555 the Backup/Restore Tool, in operation 556 the Canary Tool, in operation 557 the Logging Tool, and in operation 558 the Virus Checker Tool.

Range 1—Set to Read-Only after Range 1 is configured and the Tools written.
  Configuration Step A Tools.
  Configuration Step B Tools.
Range 2—Set to Locked after it is configured by Configured Step B Tools. The User Authority unlock state supported is Read-Only. The executable toolset available in Range 2 includes, but is not limited to, the following Tools. The specific factoring of the functionality into executable read-only objects is at the discretion of the programming.

1. Backup—Restore Tool. This tool performs incremental, journaled backups of host files into Range 4 and restores of Range 4 backups to the host. The sequence is that this tool can open Range 3 for Read/Write, Read-Only, or Write-Only on a minimum need basis. This backup Tool can perform an incremental backup on the Host to the Backup Range 4 and a full restore on the Host to an appropriately defined storage device.

2. Canary Tool. This tool can write 'canary files' to the Host Storage environment and will record what and where these files are written. Once configured and its state recorded in Range 3, then Range 3 may be opened by the Canary tool in Read-Only mode to inspect the Host for canary files that have been modified. Generally speaking, the goal is to place at least 1000 Canary files and to recognize an attack if a sufficient number of one extension type no longer matches the signatures associated with them. If the threshold is reached, the Canary Tool can be configured from the Configuration B step to halt the next backup and offer to restore or automatically restore.

3. Virus Checker Tool. This is a Virus Checker with signatures stored in Range 3 and results kept in Range 3. It is not made to be installed on the host and is meant to trigger a restore action. If malware is found of a sufficient threat level, this tool can halt the next backup and offer to restore or automatically restore the Host backup.

4. Set Range 1 to Boot Tool. If the host operating environment is deemed to possibly be unsafe, the Diamond Drive can boot to Range 1 with limited capabilities as determined by the boot Tool. Booting to Range 1 permits the Diamond Drive to open Range 2 and 3 and 4 as appropriate in a known secure operating system that is only employed for the one use as a reference monitor malware detection and remediation mechanism. If the attached storage device is used to boot its own OS, then the above tools are available for that OS as well.

Any tool can write to the Range 5 Forensic Log. As above, Range 5 requires User 4 credentials but is Write-Only by User 4 credentials. From the scratch pad the current write position and the limit is discovered, and the tool submits a write to a Diamond process that writes log entries in sequence, updates the scratch pad data, and frees the scratch pad for further writing by a tool. By default the Forensic Log will cyclically overwrite if its capacity is exceeded. The Administrator authority can access Range 5 for Reading.

On occasion it may be desirable to update the Toolset on a drive. Updates require Administrator authority and are preferably only done in a secure context. Among the secondary Tools for maintaining the primary tools listed in some embodiments is a Tool that can check for updates and perform the necessary updates on an attached Diamond drive.

It should be noted the five Range model above is a preferred embodiment. In theory, a secure configuration can be done merging Range 3 and 4 above and also merging Range 1 and 2 above. In fact, just as distinguishing these range functions with different User authorities is an improvement over this merging, more ranges can be defined to improve the security profile by separating temporary configuration storage for each of the Range 1 and 2 Tools into separate ranges. For example, there may be a separate User authority for each of the major tools. There could be a Forensic Logging range for each major tool as well. It is also anticipated that there could be more than one backup in Range 4, or an additional range to support each additional backup.

Figure 6:
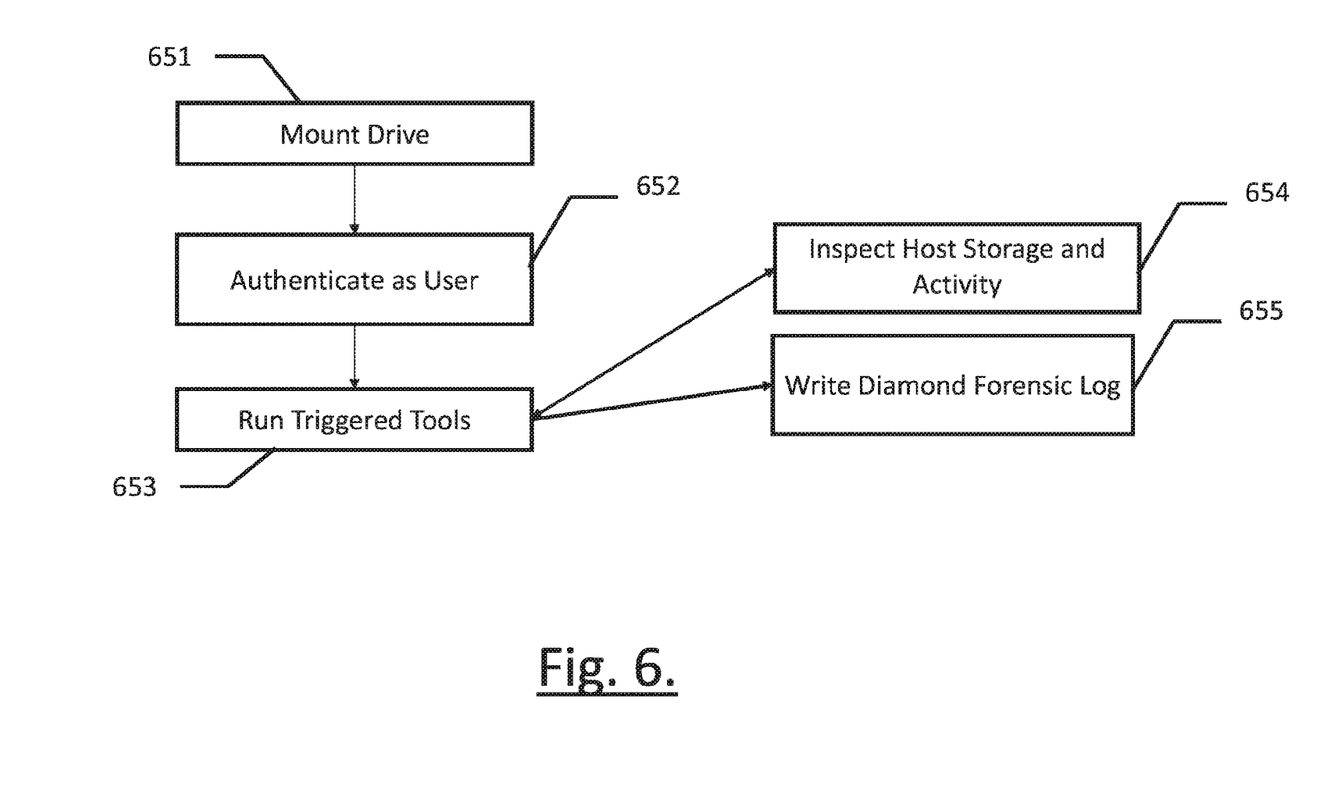
FIG. 6 illustrates a drive in use according to some embodiments of the current disclosure.

In routine use, FIG. 6 shows that the use is begun by mounting the drive 651, authenticating User 1 in operation 652, and running the tools triggered by the configurations set on the tools in operation 653. Once one or more of the tools is running it may inspect host storage and activity against the reference state in operation 654. The reference state depends on the tool. In the case of backup, it is the changes in the Host storage that occurred since the last backup. In the case of the canary tool, it is deviations in the canary files from their originally placed values. In the case of the virus checker tool, it is deviations in the signatures of executable files on the host. Running the triggered tools also writes to the Forensic Log to describe the time and date obtained from the host against a Diamond Drive scratchpad value on the last time and date reported by the Host in operation 655.

Those skilled in the art will recognize improvements and modifications to the preferred embodiments of the present disclosure. All such improvements and modifications are considered within the scope of the concepts disclosed herein and the claims that follow.

What is claimed is:

1. A storage device comprising:
    a memory; and
    computing circuitry configured to:
        provide advanced data and program protection for data stored in a plurality of storage ranges in the memory, including providing:
            data-at-rest protection for the data;
            data-in-motion protection for the data; and
            data-in-use protection for the data;
        configure one or more storage ranges in the plurality of storage ranges as one or more read-only ranges for executable tools by a host computer;
        configure one or more storage ranges in the plurality of storage ranges as one or more write-only ranges for forensic logging;
        where the memory comprises authentication credentials for using the one or more storage ranges on the storage device which are independent of the authentication credentials for normal operation of the host computer;
        where the authentication credentials for using the plurality of storage ranges comprises one or more of the group consisting of:
            authentication credentials for provisioning access to the one or more configured storage ranges; and
            authentication credentials for accessing the one or more configured storage ranges.

2. The storage device of claim 1 wherein the computing circuitry is further operable to: configure one or more storage ranges including one or more intermittently read- or write-only ranges for backing up known good boot and operating software and/or data on the host computer.

3. The storage device of claim 1 wherein the storage device comprises an alternative boot device for the host computer and is configured to provide read-only access to that boot.

4. The storage device of claim 1 wherein the storage device comprises a backup or normal boot device for the host computer with its own read-only boot range.

5. The storage device of claim 1 wherein the memory comprises one or more tools for virus checking and/or other checking for host computer operation integrity in the normal host computer operating environment including one or more of: normal host computer program data; file system storage; boot storage; and active memory usage.

6. The storage device of claim 1 wherein the storage device comprises one of the group consisting of:
    an attached storage device using USB or other attached storage protocols;
    a secondary internal storage device using internal host computer storage protocols; and
    a network attached storage device using network attached storage protocols.

7. The storage device of claim 1 wherein the storage device provides said data-at-rest, data-in-use, and data-in-motion protection for legacy host computers.

8. The storage device of claim 1 wherein the storage device provides said data-at-rest, data-in-use, and data-in-motion protection for new equipment specifically configured for such protections at the time of manufacture or assembly.

* * * * *